(12) United States Patent
Heo et al.

(10) Patent No.: US 9,747,886 B2
(45) Date of Patent: Aug. 29, 2017

(54) METHOD FOR CANCELLING NOISE OF AUDIO SIGNAL AND ELECTRONIC DEVICE THEREOF

(71) Applicant: Samsung Electronics Co., Ltd., Suwon-si, Gyeonggi-do (KR)

(72) Inventors: Seung-Yoon Heo, Suwon-si (KR); Kiwon Kim, Seongnam-si (KR); Gunhyuk Yoon, Suwon-si (KR); Youngsoo Park, Suwon-si (KR); Chulmin Choi, Seoul (KR); Ho-Chul Hwang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/079,910

(22) Filed: Mar. 24, 2016

(65) Prior Publication Data

US 2016/0351182 A1  Dec. 1, 2016

(30) Foreign Application Priority Data

May 28, 2015  (KR) .......................... 10-2015-0075280

(51) Int. Cl.
*G10K 11/16* (2006.01)
*G10K 11/178* (2006.01)
*H04B 1/10* (2006.01)

(52) U.S. Cl.
CPC ......... *G10K 11/178* (2013.01); *H04B 1/1027* (2013.01); *G10K 2210/108* (2013.01); *G10K 2210/3014* (2013.01); *G10K 2210/3016* (2013.01)

(58) Field of Classification Search
CPC .............. H04B 15/00; H04B 2215/061; H04B 1/1027; H04B 1/126; H04M 1/6058
USPC ....... 381/71.9, 94.5; 455/63.1, 226.3, 226.1; 370/347

See application file for complete search history.

(56) References Cited

U.S. PATENT DOCUMENTS

| 2009/0168743 | A1* | 7/2009 | Lee .................... H04B 15/00 370/347 |
| 2012/0257768 | A1 | 10/2012 | Park et al. |
| 2012/0308013 | A1 | 12/2012 | Kim |
| 2013/0122844 | A1* | 5/2013 | Itasaki ................ H04B 1/1027 455/226.3 |

FOREIGN PATENT DOCUMENTS

CN  1968473 A  5/2007

\* cited by examiner

*Primary Examiner* — Melur Ramakrishnaiah
(74) *Attorney, Agent, or Firm* — Jefferson IP Law, LLP

(57) ABSTRACT

An apparatus and method for cancelling a noise of an audio signal in an electronic device are provided. The electronic device includes a communication module configured to provide a voice call service with a counterpart electronic device, a memory configured to store one or more noise cancellation variables, and a processor configured to, when a call with the counterpart electronic device is configured through the communication module, select a noise cancellation variable corresponding to a reception signal strength from the memory and cancel an audio signal noise based on a noise cancellation variable corresponding to the reception signal.

18 Claims, 12 Drawing Sheets

METHOD FOR CANCELLING NOISE OF AUDIO SIGNAL AND ELECTRONIC DEVICE THEREOF

CROSS-REFERENCE TO RELATED APPLICATION(S)

This application claims the benefit under 35 U.S.C. §119(a) of a Korean patent application filed on May 28, 2015 in the Korean Intellectual Property Office and assigned serial No. 10-2015-0075280, the entire disclosure of which is hereby incorporated by reference.

TECHNICAL FIELD

The present disclosure relates to an apparatus and method for cancelling a noise of an audio signal in an electronic device.

BACKGROUND

When using a time division multiple access (TDMA) scheme like a global system for mobile communication (GSM) communication scheme, an electronic device may transmit/receive data in a communication interval (a transmission interval and a reception interval) allocated to the corresponding electronic device. Accordingly, the electronic device may consume more power in the communication interval allocated to the corresponding electronic device than in the remaining interval other than the communication interval. Particularly, the electronic device may consume more power in a transmission interval than in a reception interval, of the communication interval.

Since an electronic device using a TDMA scheme consumes a substnatial amount of power in a transmission interval, a TDMA noise of a specific frequency may be generated.

The above information is presented as background information only to assist with an understanding of the present disclosure. No determination has been made, and no assertion is made, as to whether any of the above might be applicable as prior art with regard to the present disclosure.

SUMMARY

An electronic device may use an automatic gain control (AGC) scheme and a noise suppression (NS) scheme for a time division multiple access (TDMA) noise reduction.

A TDMA noise becomes more severe as a transmission power of an electronic device increases, and thus causes a problem of decreasing call quality. For example, an electronic device may use transmission power differently according to the characteristics (e.g., electric field strength) of a wireless environment in which the electronic device is located. Accordingly, a noise of TDMA of an electronic device may appear differently according to the characteristics of a wireless environment.

However, since a variable for an automatic gain control and noise suppression is fixed without regard to the characteristic of a wireless environment, an electronic device requires a measure for efficiently cancelling a TDMA noise based on the characteristic of a wireless environment.

Aspects of the present disclosure are to address at least the above-mentioned problems and/or disadvantages and to provide at least the advantages described below. Accordingly, an aspect of the present disclosure is to provide a device and a method for adaptively cancelling a noise of an audio signal based on the characteristic (e.g., electric field strength) of a wireless environment in an electronic device.

In accordance with an aspect of the present disclosure, an electronic device is provided. The electronic device includes a communication module configured to provide a voice call service with a counterpart electronic device, a memory configured to store one or more noise cancellation variables, and a processor configured to, when a call with the counterpart electronic device is set up (or configured) through the communication module, select a noise cancellation variable corresponding to a reception signal strength from the memory and cancel an audio signal noise based on a noise cancellation variable corresponding to the reception signal.

In accordance with another aspect of the present disclosure, an electronic device is provided. The electronic device includes a communication module configured to provide a voice call service with a counterpart electronic device, a memory configured to store a noise cancellation variable for each electric field strength, and a processor configured to, when a call with the counterpart electronic device is set up through the communication module, detect an electric field strength of the electronic device, change a noise cancellation variable to correspond to the detected electric field strength in response to a change in the electric field strength, and cancel a noise of an audio signal based on a noise cancellation variable corresponding to the detected electric field strength.

In accordance with another aspect of the present disclosure, an operation method of an electronic device is provided. The operation method includes establishing a call with a counterpart electronic device, selecting a noise cancellation variable corresponding to the strength of a reception signal, and cancelling a noise of an audio signal based on the noise cancellation variable corresponding to the strength of a reception signal.

In accordance with another aspect of the present disclosure, an operation method of an electronic device is provided. The operation method includes establishing a call with a counterpart electronic device, detecting an electric field strength of the electronic device, changing a noise cancellation variable to correspond to the detected electric field strength in response to a change in the electric field strength, and cancelling a noise of an audio signal based on a noise cancellation variable corresponding to the detected electric field strength.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
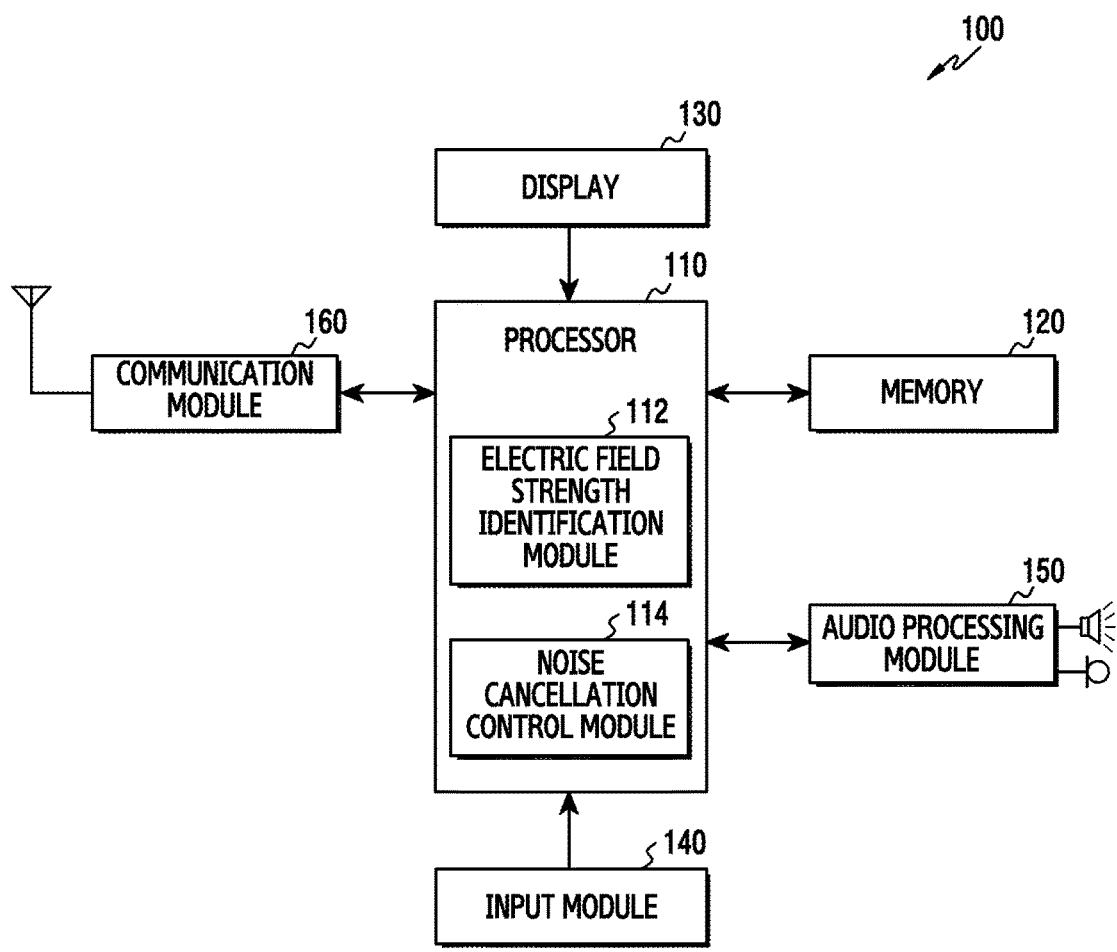
FIG. 1 illustrates a block diagram of an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expression "have", "may have", "include", or "may include" refers to the existence of a corresponding feature (e.g., numeral, function, operation, or constituent element such as component), and does not exclude one or more additional features.

Throughout the specification, the expressions "A or B," "at least one of A or/and B," "one or more of A or/and B," and the like may include all combinations of the listed items. For example, "A or B," "at least one of A and B," or "at least one of A or B" may refer to all cases of (1) including at least one A, (2) including at least one B, or (3) including both at least one A and at least one B.

The expression "a first", "a second", "the first", or "the second" used in various embodiments of the present disclosure may modify various components regardless of the order and/or the importance but does not limit the corresponding components. The above-described expressions may be used to distinguish an element from another element. For example, a first user device and a second user device indicate different user devices although both of them are user devices. For example, a first element may be termed a second element, and similarly, a second element may be termed a first element without departing from the scope of the present disclosure.

It will be understood that when an element (e.g., a first element) is referred to as being "(operatively or communicatively) coupled with/to" or "connected to" another element (e.g., a second element), it can be directly connected to the other element, or can be connected to the other element through another element (e.g., a third element). In contrast, it could be understood that when an element (e.g., a first element) is referred to as being "directly connected to" or "directly coupled to" another element (e.g., a second element), there is no intervening element (e.g., a third element) between the element and the other element.

The expression "configured (or set) to", used in this specification, may be interchangeably used with, for example, "suitable for," "having the capacity to," "designed to," "adapted to," "made to," or "capable of" according to circumstances. The term "configured (or set) to" may not necessarily mean "specifically designed to" in hardware. Instead, in some cases, the expression "device configured to" may mean that the electronic device "can ~" together with other electronic devices or components. For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe various embodiments, and are not intended to limit the present disclosure. As used herein, singular forms may include plural forms as well unless the context clearly indicates otherwise. Unless defined otherwise, all terms used herein, including technical terms and scientific terms, may have the same meaning as commonly understood by a person of ordinary skill in the art to which the present disclosure pertains. Terms, such as those defined in commonly used dictionaries, should be interpreted as having a meaning that is the same or similar to their meaning in the context of the relevant art and will not be interpreted in an idealized or overly formal sense unless expressly so defined herein. In some cases, even the terms defined herein may not be construed to exclude embodiments of the present disclosure.

An electronic device according to various embodiments of the present disclosure, for example, may include at least one of a smartphone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), a Moving Picture Experts Group phase 1 or phase 2 (MPEG-1 or MPEG-2) audio layer 3 (MP3) player, a mobile medical appliance, a camera, and a wearable device (e.g., smart glasses, a head-mounted-device (HMD), electronic clothes, an electronic bracelet, an electronic necklace, an electronic appcessory, an electronic tattoo, a smart mirror, or a smart watch).

According to some embodiments, the electronic device may be a smart home appliance. The home appliance may include at least one of, for example, a television (TV), a digital versatile disc (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment of the present disclosure, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic device for a ship (e.g., a navigation device for a ship, and a gyro-compass), avionics, security devices, an automotive head unit, a robot for home or industry, an automatic teller's machine (ATM) in banks, a point of sales (POS) in a shop, or an internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates a block diagram of an electronic device according to various embodiments of the present disclosure.

Referring to FIG. 1, an electronic device 100 may include a processor 110 (e.g., including processing circuitry), a memory 120, a display 130 (e.g., including a display panel and display circuitry), an input module 140 (e.g., including input circuitry), an audio processing module 150 (e.g., including audio processing circuitry), and a communication module 160 (e.g., including communication circuitry).

The electronic device 100 may include one or more processors 110. The processor 110 may include a CPU, an AP, or a communication processor (CP).

According to an embodiment of the present disclosure, the processor 110 may control to allow a call with a counterpart electronic device to be connected through the communication module 160.

According to an embodiment of the present disclosure, when the call with a counterpart electronic device is connected, the processor 110 may control the audio processing module 150 to cancel a noise of an audio signal using an electric field identification module 112 and a noise cancellation control module 114.

The electric field strength identification module 112 may determine the electric field strength of the electronic device 100, that corresponds to a reception signal strength.

According to an embodiment of the present disclosure, the electric field strength identification module 112 may identify an electric field strength based on the strength of a received signal (e.g., radio frequency (RF) signal) through the communication module 160. For example, the electric field strength identification module 112 may determine an electric field strength of the electronic device 100 based on a reception signal strength measured through a signal strength measurement module (not shown). Here, the strength of a signal may indicate a received signal strength indicator (RSSI), a reference signal received power (RSRP), and the like.

According to an embodiment, the electric field strength identification module 112 may determine an electric field strength based on the quality of a received signal (e.g., RF signal) through the communication module 160. Here, the quality of the signal may be indicated as a reference signal received quality (RSRQ), a received signal code power (RCSP), an Ec/Io ratio, a bit error rate (BER), a frame error rate (FER), and the like.

According to an embodiment of the present disclosure, the electric field strength identification module 112 may determine an electric field strength based on a transmission output level (TX power level) of the electronic device 100. For example, the electronic device 100 may determine a transmission output level based on a control signal provided from a connected serving base station.

The noise cancellation control module 114 may adaptively control a noise cancellation of an audio signal based on an electric field strength of the electronic device 100 identified by the electric field strength identification module 112.

According to an embodiment of the present disclosure, the noise cancellation control module 114 may select a noise cancellation variable of the audio processing module 150 based on an electric field strength of the electronic device 100 identified by the electric field strength identification module 112. For example, when an electric field strength of the electronic device 100 is identified as a weak electric field in the electric field strength identification module 112, the noise cancellation control module 114 may select a noise cancellation variable corresponding to the weak electric field among noise cancellation variables stored in the memory 120. For example, when an electric field strength of the electronic device 100 is identified as a strong electric field in the electric field strength identification module 112, the noise cancellation control module 114 may select a noise cancellation variable corresponding to the strong electric field among noise cancellation variables stored in the memory 120. For example, a noise cancellation variable may include at least one of an automatic gain control (AGC) level, a noise suppression level, and a high pass filter (HPF) value. Here, the automatic gain control level may include an expander value (EXP) for an automatic gain control.

According to an embodiment of the present disclosure, when the electric field strength identification module 112 detects an electric field strength change in the electronic device 100, the noise cancellation control module 114 may change a noise cancellation variable of the audio processing module 150 to be a noise cancellation variable corresponding to the electric field strength of the electronic device 100. For example, when an electric field strength of the electronic device 100 is changed to a weak electric field, the noise cancellation control module 114 may change a noise cancellation variable of the audio processing module 150 to a noise cancellation variable corresponding to a weak electric field. For example, when an electric field strength of the electronic device 100 is changed to a strong electric field, the noise cancellation control module 114 may change a noise cancellation variable of the audio processing module 150 to a noise cancellation variable corresponding to a strong electric field.

According to an embodiment of the present disclosure, the noise cancellation control module 114 may control to allow the audio processing module 150 to selectively perform noise cancellation based on an electric field strength of the electronic device 100 identified in the electric field strength identification module 112. For example, when an electric field strength of the electronic device 100 is identified as a weak electric field in the electric field strength identification module 112, the noise cancellation control module 114 may control to allow the audio processing module 150 to perform noise cancellation based on a noise cancellation variable stored in the memory 120. For example, when the electric field strength identification module 112 identifies an electric field strength of the electronic device 100 as a strong electric field, the noise cancellation control module 114 may control to allow the audio processing module 150 not to perform noise cancellation.

The memory 120 may store a command or data related to an element including the electronic device 100. According to an embodiment of the present disclosure, the memory 120 may store one or more noise cancellation variables for performing noise cancellation by the audio processing module 150. For example, as shown in Table 1, the memory 120 may store noise cancellation variables corresponding to electric field strengths, respectively.

TABLE 1

| Weak electric field | Narrow band | Headset |
| | | Speaker |
| | | Earphones |
| | | Bluetooth |
| | Wide band | Headset |
| | | Speaker |
| | | Earphones |
| | | Bluetooth |
| Strong electric field | Narrow band | Headset |
| | | Speaker |
| | | Earphones |
| | | Bluetooth |
| | Wide band | Headset |
| | | Speaker |
| | | Earphones |
| | | Bluetooth |

As shown in Table 1, the memory 120 may classify a noise cancellation variable for cancelling a noise of an audio signal in a weak electric field and a noise cancellation variable for cancelling a noise of an audio signal in a strong electric field so as to store the same. In addition, the memory 120 may store noise cancellation variables by classifying the same based on characteristics (e.g., type) of a device for a narrowband, a wideband, and an audio signal output in each electric field strength.

The display 130 may display, for example, various types of contents (e.g., text, images, videos, icons, symbols, or the like) to the user. The display 130 may include, for example, a liquid crystal display (LCD), a light-emitting diode (LED) display, an organic LED (OLED) display, a micro electromechanical systems (MEMS) display, or an electronic paper display.

According to an embodiment of the present disclosure, the display 130 may include a touch screen. In this case, the display 130 may receive a touch, a gesture, a proximity, or a hovering input using an electronic pen or a part of a user's body.

The input module 140 may transmit a command or data for controlling an operation of an electronic device, which is input by a user or another external device to other elements of the electronic device. For example, the input module 140 may include a key pad, a dome switch, a physical button, a touch pad (static pressure/capacitive), a jog & shuttle, and the like.

The audio processing module 150 may provide an audio interface between a user and the electronic device 100 through a speaker and a microphone.

According to an embodiment of the present disclosure, the audio processing module 150 may cancel a noise of an audio signal based on a noise cancellation variable determined by the processor 110. For example, the audio processing module 150 may cancel a noise of an audio signal based on a noise cancellation variable selected or changed by the noise cancellation control module 114 of the processor 110.

According to an embodiment of the present disclosure, the audio processing module 150 may selectively cancel a noise of an audio signal based on a control of the processor 110. For example, when the noise cancellation control module 114 of the processor 110 has determined to perform noise cancellation, the audio processing module 150 may cancel a noise of an audio signal based on a noise cancellation variable selected by the noise cancellation control module 114.

The communication module 160 may transmit/receive a signal between the electronic device 100 and another external device (e.g., another electronic device or a server). The communication module 160 may include a cellular module and a non-cellular module. For example, a cellular module may enable a communication between the electronic device 100 and another electronic device and/or a server by using one more cellular communication protocols using a time division multiple access (TDMA) scheme. For example, a non-cellular module may enable a communication between the electronic device 100 and another electronic device and/or a server by using a near field communication. Here, the near field communication scheme may include at least one of WiFi, Bluetooth (BT), BT low energy (BLE), near field communication (NFC), ZigBee, and the like.

According to various embodiments of the present disclosure, the electronic device 100 may configure at least one of the electric field strength identification module 112 and the noise cancellation control module 114 to be a separate module different from the processor 110.

Figure 2:
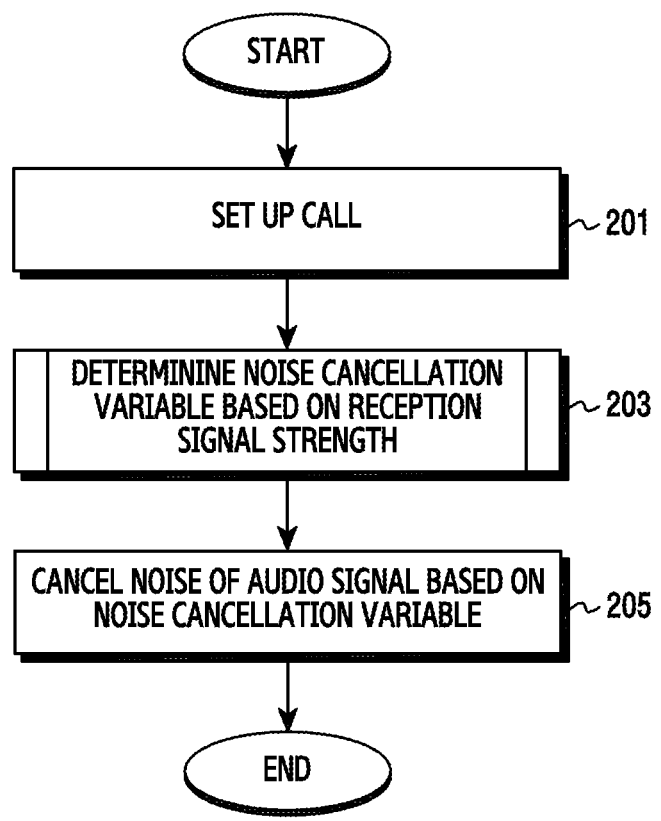
FIG. 2 illustrates a flowchart for cancelling a noise of an audio signal in an electronic device according to various embodiments of the present disclosure.

FIG. 2 illustrates a flowchart for cancelling a noise of an audio signal according to various embodiments of the present disclosure.

Referring to FIG. 2, an electronic device (e.g., the electronic device 100) may set up a call in operation 201. For example, the processor 110 may connect a call of a counterpart electronic device based on a call request of the counterpart electronic device, which is received by the communication module 160. For example, when occurrence of a call connection event is detected based on input information provided by the input module 140, the processor 110 may connect a call of a counterpart electronic device corresponding to the input information.

In operation 203, the electronic device 100 may determine a noise cancellation variable based on a received signal strength. For example, the processor 110 may estimate an electric field strength of the electronic device 100 based on a received signal strength. The processor 110 may select a noise cancellation variable corresponding to an electric field strength of the electronic device 100 in one or more noise cancellation variables stored in the memory 120. Here, the noise cancellation variable may include at least one of an AGC level, a noise suppression level, and an HPF value.

In operation 205, the electronic device 100 may cancel a noise of an audio signal based on a noise cancellation variable determined based on a received signal strength. For example, the processor 110 may control the audio processing module 150 so as to cancel a noise of an audio signal provided by a counterpart electronic device based on a noise cancellation variable determined based on a received signal strength.

Figure 3:
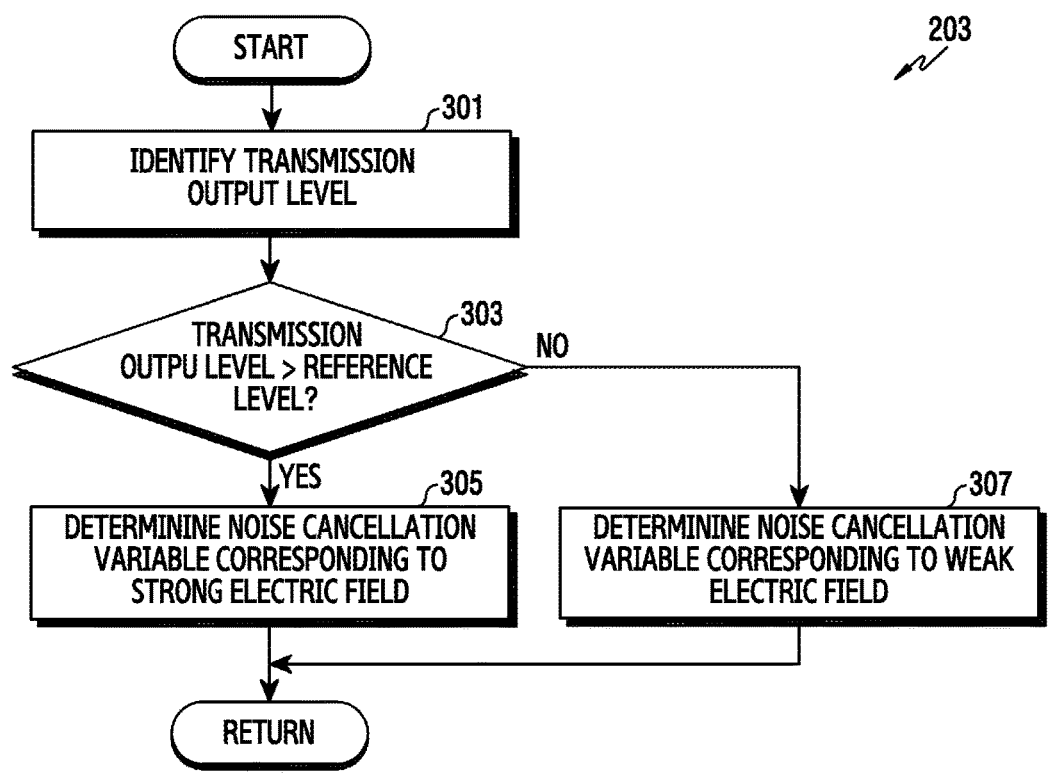
FIG. 3 illustrates a flowchart for determining a noise cancellation variable based on a transmission output level in an electronic device according to various embodiments of the present disclosure.

FIG. 3 illustrates a flowchart for determining a noise cancellation variable based on a transmission output level in an electronic device according to various embodiments of the present disclosure. The description below may describe an operation for determining a noise cancellation variable based on a received signal strength in operation 203 of FIG. 2.

Referring to FIG. 3, in operation 301, an electronic device (e.g., the electronic device 100) may determine a transmission power level. For example, the processor 110 may determine a transmission output level determined based on a control signal provided from a serving base station to which the electronic device 100 is connected.

In operation 303, the electronic device 100 may determine whether a transmission output level exceeds a reference level. Here, the reference level may indicate a transmission output level that is predefined to enable an electric field strength of the electronic device 100 to be classified based on the transmission output level.

In operation 305, the electronic device 100 may determine an electric field strength of the electronic device 100 to be a strong electric field when a transmission output level exceeds a reference level. Accordingly, the electronic device 100 may determine a noise cancellation variable corresponding to a strong electric field. For example, the processor 110 may select a noise cancellation variable corresponding to a strong electric field in one or more noise cancellation variables stored in the memory 120.

In operation 307, the electronic device 100 may determine an electric field strength of the electronic device 100 to be a weak electric field when a transmission output level is equal to or less than a reference level. Accordingly, the electronic device 100 may determine a noise cancellation variable corresponding to a weak electric field. For example, the processor 110 may select a noise cancellation variable corresponding to a weak electric field in one or more noise cancellation variables stored in the memory 120.

Figure 4:
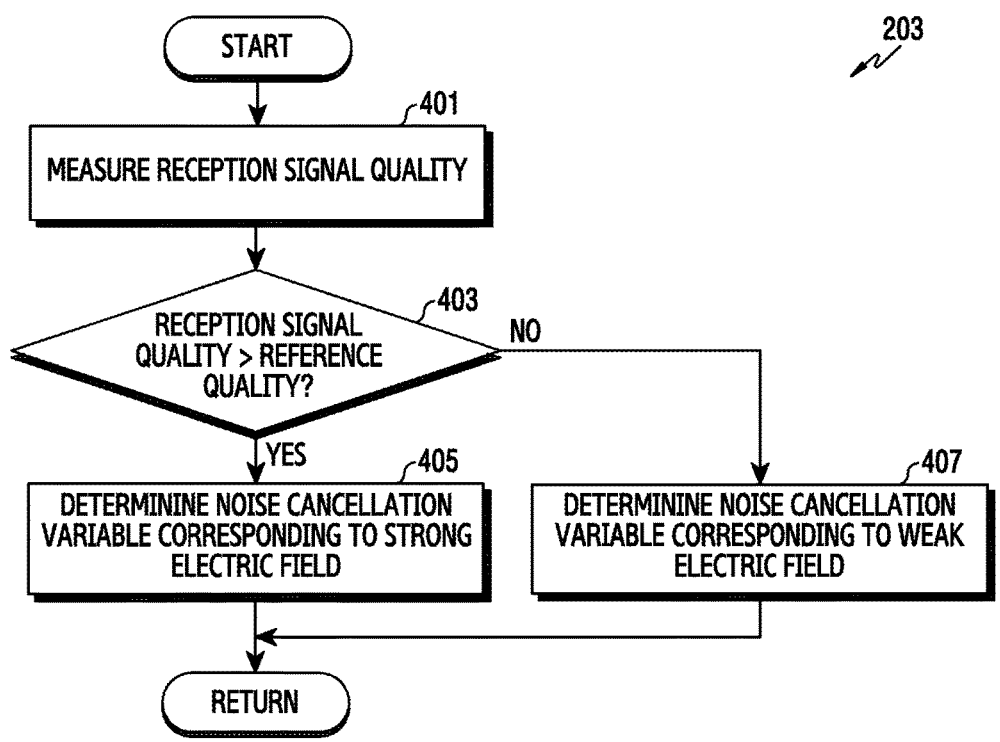
FIG. 4 illustrates a flowchart for determining a noise cancellation variable based on the quality of a reception signal in an electronic device according to various embodiments of the present disclosure.

FIG. 4 illustrates a flowchart for determining a noise cancellation variable based on the quality of a reception signal in an electronic device according to various embodiments of the present disclosure. The description below may describe an operation for determining a noise cancellation variable based on a received signal strength in operation 203 of FIG. 2.

Referring to FIG. 4, an electronic device (e.g., the electronic device 100) may determine a reception signal quality in operation 401. For example, the electronic device 100 may measure the strength of a signal received (e.g., RSSI, RSRP, etc.) by the communication module 160. For example, the electronic device 100 may calculate the quality of a received signal (e.g., RSRQ, RCSP, Ec/Io, BER, FER, etc.) by the communication module 160.

In operation 403, the electronic device 100 may determine whether the quality of a received signal is greater than a reference quality. Here, the reference quality may indicate a quality that is predefined to enable an electric field strength of the electronic device 100 to be classified based on the quality of a received signal.

In operation 405, the electronic device 100 may determine an electric field strength of the electronic device 100 to be a strong electric field when the quality of a received signal exceeds a reference quality. Accordingly, the electronic device 100 may determine a noise cancellation variable corresponding to a strong electric field. For example, the processor 110 may select a noise cancellation variable corresponding to a strong electric field in one or more noise cancellation variables stored in the memory 120.

In operation 407, the electronic device 100 may determine an electric field strength of the electronic device 100 to be a weak electric field when the quality of a received signal is equal to or less than a reference quality. Accordingly, the electronic device 100 may determine a noise cancellation variable corresponding to a weak electric field. For example, the processor 110 may select a noise cancellation variable corresponding to a weak electric field in one or more noise cancellation variables stored in the memory 120.

Figure 5:
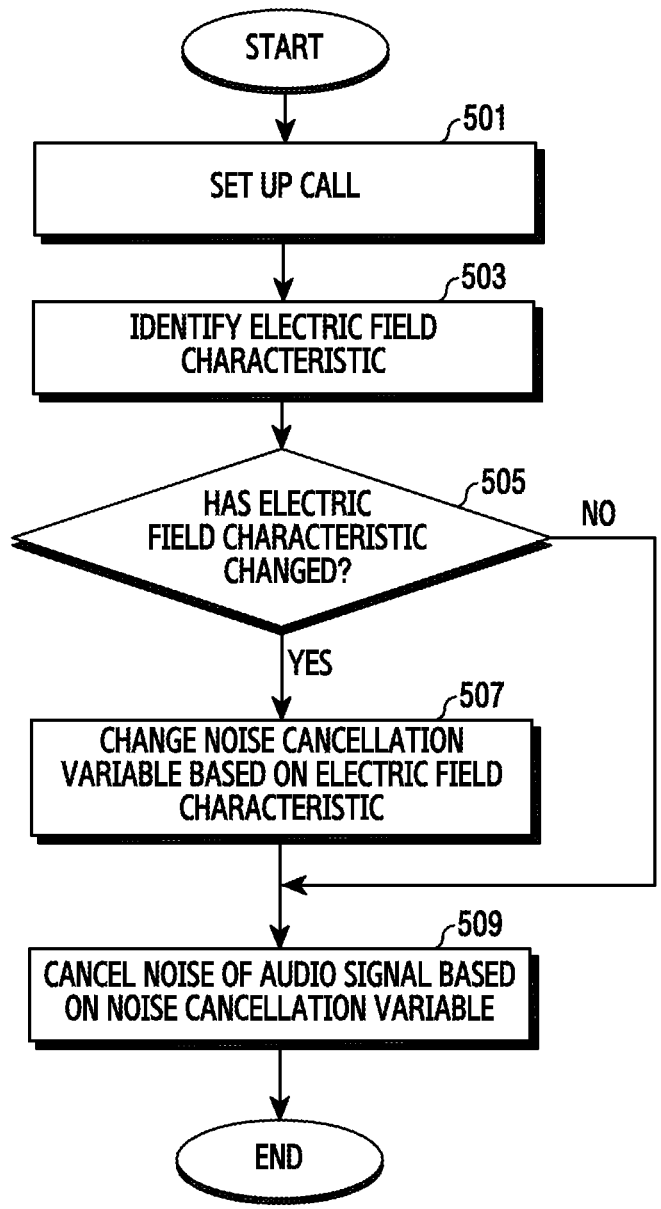
FIG. 5 illustrates a flowchart for determining a noise cancellation variable based on a change in an electric field strength in an electronic device according to various embodiments of the present disclosure.

FIG. 5 illustrates a flowchart for determining a noise cancellation variable based on a change in an electric field strength in an electronic device according to various embodiments of the present disclosure.

Referring to FIG. 5, an electronic device (e.g., the electronic device 100) may set up a call in operation 501. For example, the processor 110 may control the display 130 so as to display call request information (e.g., a reception screen) when a call request signal is received by a counterpart electronic device through the communication module 160. The processor 110 may connect with a call of a counterpart electronic device when a call connection input is detected by the input module 140 in response to a display of call request information. For example, the processor 110 may connect a call of a counterpart electronic device corresponding to input information when occurrence of a call connection event is detected based on the input information provided by the input module 140.

In operation 503, the electronic device 100 may determine an electric field strength. For example, the processor 110 may determine an electric field strength of the electronic device 100 based on a transmission output level. For example, the processor 110 may determine an electric field strength of the electronic device 100 based on the quality of a received signal. Here, the received signal quality may include a received signal strength.

In operation 505, the electronic device 100 may determine whether an electric field strength has changed.

In operation 509, the electronic device 100 may cancel a noise of an audio signal based on a preconfigured noise cancellation variable (a noise cancellation variable corresponding to an electric field strength of the electronic device 100) when the electric field has not changed. For example, the processor 110 may control so as to maintain a noise cancellation variable of the audio processing module 150.

In operation 507, the electronic device 100 may change a noise cancellation variable to correspond to an electric field strength when the electric field strength has changed. For example, the processor 110 may select a noise cancellation variable corresponding to an electric field strength of the electronic device 100 in one or more noise cancellation variables stored in the memory 120. The processor 110 may change a noise cancellation variable that is used for noise cancellation to a noise cancellation variable corresponding to an electric field strength of the electronic device 100, in the audio processing module 150.

In operation 509, the electronic device 100 may cancel a noise of an audio signal based on a cancellation variable corresponding to an electric field strength. For example, the audio processing module 150 may cancel a noise of an audio signal provided from a counter electronic device based on a noise cancellation variable changed by the processor 110.

Figure 6:
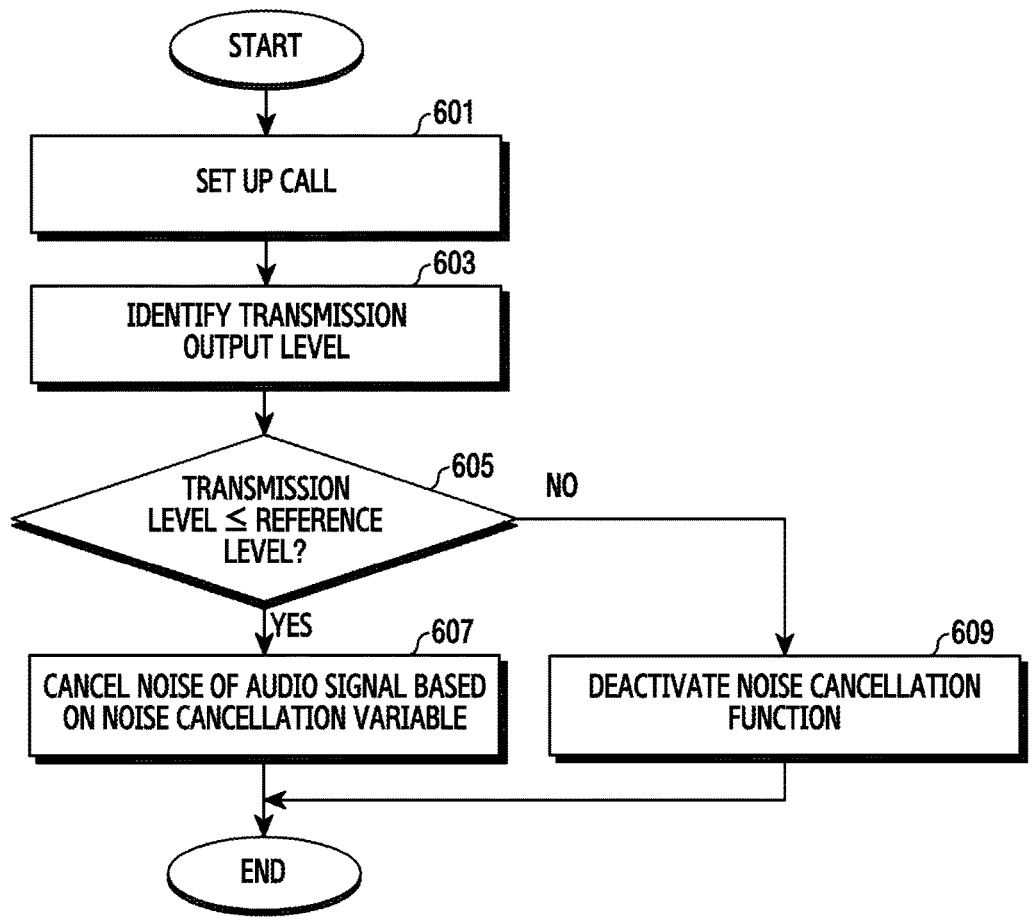
FIG. 6 illustrates a flowchart for selectively performing noise cancellation based on an electric field strength in an electronic device according to various embodiments of the present disclosure.

FIG. 6 illustrates a flowchart for selectively performing a noise cancellation based on an electric field strength in an electronic device according to various embodiments of the present disclosure.

Referring to FIG. 6, an electronic device (e.g., the electronic device 100) may set up a call in operation 601. For example, the processor 110 may connect a call of a counterpart electronic device based on a request of the counterpart electronic device. For example, the processor 110 may connect a call of a counterpart electronic device based on a request of the electronic device 100.

In operation 603, the electronic device 100 may determine a transmission power level. For example, the processor 110 may determine a transmission output level determined based on a control signal provided from a serving base station to which the electronic device 100 is connected.

In operation 605, the electronic device 100 may determine whether a transmission output level is equal to or less than a reference level. Here, the reference level may include a transmission output level that is predefined to enable an electric field strength of the electronic device 100 to be classified based on the transmission output level.

In operation 607, the electronic device 100 may determine an electric field strength of the electronic device 100 to be a weak electric field when a transmission output level is equal to or less than a reference level. Accordingly, the electronic device may cancel a noise of an audio signal based on a noise cancellation variable corresponding to a weak electric field. For example, the processor 110 may control the audio processing module 150 so as to cancel a noise of an audio signal provided by a counterpart electronic device based on a noise cancellation variable corresponding to a weak signal stored in the memory 120.

In operation 609, the electronic device 100 may determine an electric field strength of the electronic device 100 to be a strong electric field when a transmission output level exceeds a reference level. Accordingly, the electronic device 100 may deactivate a noise cancellation function for an audio signal. For example, the processor 110 may determine that an audio quality can be maintained even without performing a noise cancellation, so as to deactivate a noise cancellation function of the audio processing module 150 when an electric field strength of the electronic device 100 is a strong electric field.

Figure 7:
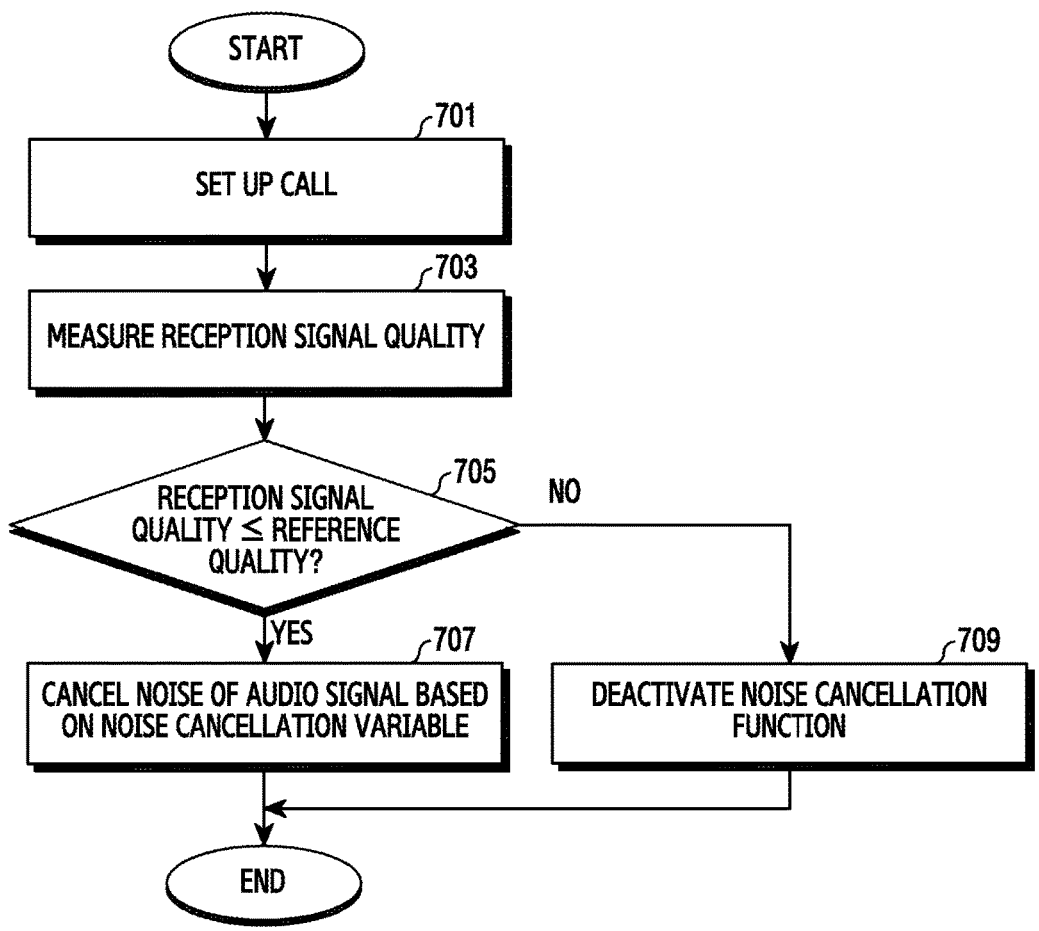
FIG. 7 illustrates a flowchart for selectively performing noise cancellation based on an electric field strength in an electronic device according to various embodiments of the present disclosure.

FIG. 7 illustrates a flowchart for selectively performing a noise cancellation based on an electric field strength in an electronic device according to various embodiments of the present disclosure.

Referring to FIG. 7, an electronic device (e.g., the electronic device 100) may set up a call in operation 701. For example, the processor 110 may connect a call of a counterpart electronic device based on a request of the electronic device 100.

In operation 703, the electronic device 100 may determine the quality of a received signal. For example, a processor 110 may determine a received signal strength (e.g., RSSI, RSRP, etc.) measured by a signal strength measurement module (not shown). For example, the electronic device 110 may calculate the quality of a received signal (e.g., RSRQ, RCSP, Ec/Io, BER, FER, etc.) by the communication module 160.

In operation 705, the electronic device 100 may determine whether the quality of a received signal is better than a reference quality. Here, the reference quality may indicate a quality that is predefined to enable an electric field strength of the electronic device 100 to be classified based on the quality of a received signal.

In operation 707, the electronic device 100 may determine an electric field strength of the electronic device 100 to be a weak electric field when the quality of a received signal is equal to or less than a reference quality. Accordingly, the electronic device 100 may cancel a noise of an audio signal based on a noise cancellation variable corresponding to a weak electric field. For example, the audio processing module 150 may cancel a noise of an audio signal provided from a counter electronic device based on a noise cancellation variable stored in the memory 120.

In operation 709, the electronic device 100 may determine an electric field strength of the electronic device 100 to be a strong electric field when the quality of a received signal exceeds a reference quality. Accordingly, the electronic device 100 may deactivate a noise cancellation function for an audio signal. For example, the audio processing module 150 may not perform a noise cancellation and output an audio signal to the outside through a speaker.

According to various embodiments of the present disclosure, an electronic device may store a noise control variable corresponding to a electric field strength. For example, an electronic device may detect and store a noise cancellation variable having optimum noise cancellation efficiency in a particular electric field strength.

According to various embodiments of the present disclosure, an operation method of an electronic device may include the operations of: setting up (or establishing) a call with a counterpart electronic device may include selecting a noise cancellation variable corresponding to the strength of a reception signal, and cancelling a noise of an audio signal based on a noise cancellation variable corresponding to the reception signal.

In various embodiments, the noise cancellation variable may include at least one of an AGC level, a noise suppression level, and an HPF value.

In various embodiments of the present disclosure, an operation of selecting the noise cancellation variable may include the operations of detecting an electric field strength corresponding to a transmission power level of the electronic device, and selecting a noise cancellation level corresponding to the electric field strength in a memory of the electronic device.

In various embodiments of the present disclosure, an operation of selecting the noise cancellation variable may include the operations of detecting an electric field strength corresponding to the reception signal quality of the electronic device, and selecting a noise cancellation level corresponding to the electric field strength in a memory of the electronic device.

In various embodiments of the present disclosure, the reception signal quality may include at least one of a reception signal strength, a BER, an FER, and a signal-to-noise ratio.

According to various embodiments of the present disclosure, an operation method of an electronic device may include setting up a call with a counterpart electronic device, detecting an electric field strength of the electronic device, changing a noise cancellation variable to correspond to the electric field strength in response to a change in the electric field strength, and cancelling a noise of an audio signal based on a noise cancellation variable corresponding to the electric field strength.

In various embodiments of the present disclosure, the operation of detecting the electric field strength may include an operation of detecting an electric field strength of the electronic device based on a transmission power level of the electronic device or a reception signal quality.

FIGS. 8A to 8D illustrate a performance change graph of an audio signal depending on noise cancellation in a weak electric field according to various embodiments of the present disclosure. The description below illustrates a change in performance depending on a noise cancellation in an environment in which a transmission power level of an electronic device using a global system for mobile communication (GSM) communication scheme is 5 (e.g., a weak electric field) and a background noise is set to be 15 dB.

FIGS. 8A to 8D may indicate a change in performance detected according to different configurations of an automatic gain control level (EXP), a noise suppression level (NS), and a HPF value in an electronic device.

Figures 8A, 8B, 8C, 8D:
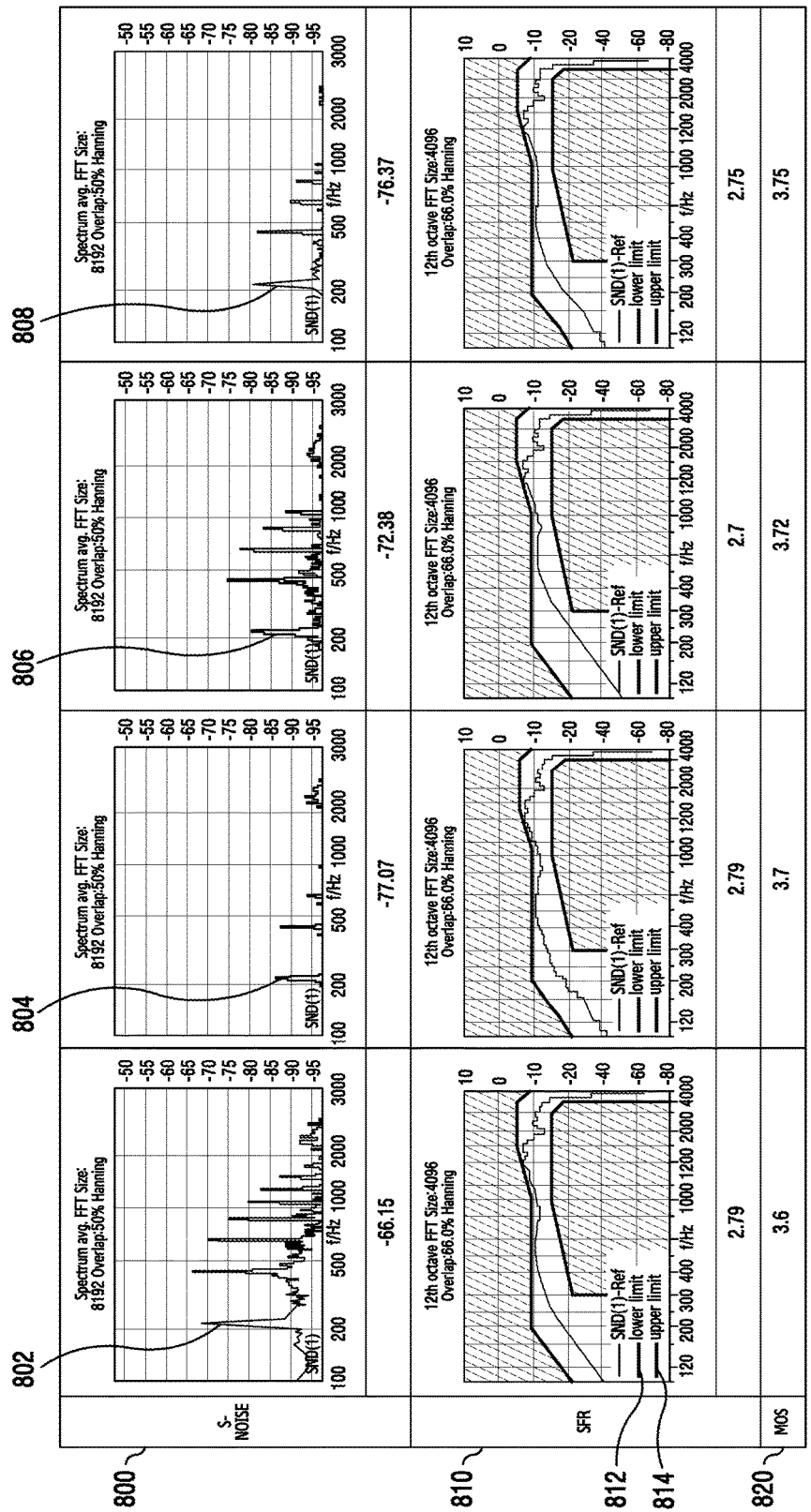
FIGS. 8A to 8D illustrate a performance change graph of an audio signal depending on noise cancellation in a weak electric field according to various embodiments of the present disclosure.

Referring to FIG. 8A, an electronic device may cancel a noise (e.g., TDMA noise) of an audio signal based on an automatic gain control level of −70 dB, a noise suppression level of 0 dB, and a high pass filter value of 300 Hz.

In this case, a sending loudness rating (SLR) that indicates the loss of volume between a talker and an access switching device is 5.79 dB, and thus the noise cancellation performance of the electronic device may be included in a normal range (e.g., 8±3 dB). An s-noise (800), that indicates a noise (802) in an interval in which the volume of talkers connected in a call is not generated, is −66.15 dBm, and thus the noise cancellation performance of the electronic device may be included in a normal range (e.g., ≤−64 dBm). A sensitivity frequency response (SFR) 810, which indicates a characteristic of change in an output depending on noise cancellation, of the noise cancellation performance of the electronic device may be included in a normal range (e.g., between an upper reference value 812 and a lower reference value 814).

A mean opinion score MOS 820 depending on the noise cancellation of an electronic device may be evaluated to be 3.6. For example, a mean opinion score, which is one of absolute category ratings (ACR) that perform an evaluation with reference to only a voice after cancelling a noise, may be evaluated to have a good voice quality when the mean opinion score is 4, and a fair voice quality when the mean opinion score is 3.

Referring to FIG. 8B, an electronic device may cancel a noise (e.g., TDMA noise) of an audio signal by changing a noise suppression level in a noise cancellation variable of FIG. 8A to 12 dB. For example, an electronic device, as shown in FIG. 8A, may determine an automatic gain control level to be −70 dB and a high pass filter value to be 300 Hz.

In this case, an SLR is 6.04 dB and a loss of a sending loudness occurs by noise cancellation. However, a noise cancellation performance of the electronic device may be included in a normal range (e.g., 8±3 dB). An s-noise (800), that indicates a noise (804) in an interval in which the volume of talkers connected in a call is not generated, is −77.07 dBm, and thus the noise cancellation performance of the electronic device may decrease the noise to be lower than that in FIG. 8A. An SFR 810, which indicates a characteristic of change in an output depending on noise cancellation, of the noise cancellation performance of the electronic device may be included in a normal range (e.g., between an upper reference value 812 and a lower reference value 814).

A mean opinion score MOS 820 of an electronic device depending on noise cancellation is 3.7 and thus a voice quality depending on noise cancellation may be further improved beyond that in FIG. 8A.

Referring to FIG. 8C, an electronic device may cancel a noise (e.g., TDMA noise) of an audio signal by changing a high pass filter value in a noise cancellation variable of FIG. 8A to 400 Hz. For example, an electronic device, as shown in FIG. 8A, may determine an automatic gain control level to be −70 dB and a noise suppression level to be 0 dB.

In this case, an SLR is 6.68 dB and a loss of a sending loudness occurs by noise cancellation. However, a noise cancellation performance of the electronic device may be included in a normal range (e.g., 8±3 dB). An s-noise (800), that indicates a noise (806) in an interval in which the volume of talkers connected in a call is not generated, is −72.38 dBm, and thus the noise cancellation performance of the electronic device may decrease the noise to be lower than that in FIG. 8A. An SFR 810, which indicates a characteristic of change in an output depending on noise cancellation, of the noise cancellation performance of the electronic device may be included in a normal range (e.g., between an upper reference value 812 and a lower reference value 814).

A mean opinion score MOS 820 of an electronic device depending on noise cancellation is 3.72 and thus a voice quality depending on noise cancellation may be further improved beyond that in FIG. 8A.

Referring to FIG. 8D, an electronic device may cancel a noise (e.g., TDMA noise) of an audio signal by changing an automatic gain control level in a noise cancellation variable of FIG. 8A to −60 dB. For example, an electronic device, as shown in FIG. 8A, may determine a noise suppression level to be 0 dB and a high pass filter value to be 300 Hz.

In this case, an SLR is 5.84 dB and a loss of a sending loudness occurs by noise cancellation. However, a noise cancellation performance of the electronic device may be included in a normal range (e.g., 8±3 dB). An s-noise (800), that indicates a noise (808) in an interval in which the volume of talkers connected in a call is not generated, is −76.37 dBm, and thus the noise cancellation performance of the electronic device may decrease the noise to be lower than that in FIG. 8A. An SFR 810, which indicates a characteristic of change in an output depending on noise cancellation, of the noise cancellation performance of the electronic device may be included in a normal range (e.g., between an upper reference value 812 and a lower reference value 814).

A mean opinion score MOS 820 of an electronic device depending on noise cancellation is 3.75 and thus a voice quality depending on noise cancellation may be further improved beyond that in FIG. 8A.

According to an embodiment, an electronic device may determine a noise cancellation variable of a weak electric field based on an audio signal performance depending on a noise cancellation of FIGS. 8A to 8D so that an automatic gain control level is −60 dB, a noise suppression level is 0 dB, and a high pass filter value is 300 Hz.

According to various embodiments of the present disclosure, an electronic device may cancel a noise of an audio signal using a noise control variable corresponding to an electric field strength. In this case, the electronic device may be able to improve the performance of an audio signal depending on noise cancellation as described in FIGS. 9A and 9B below.

Figures 9A, 9B:
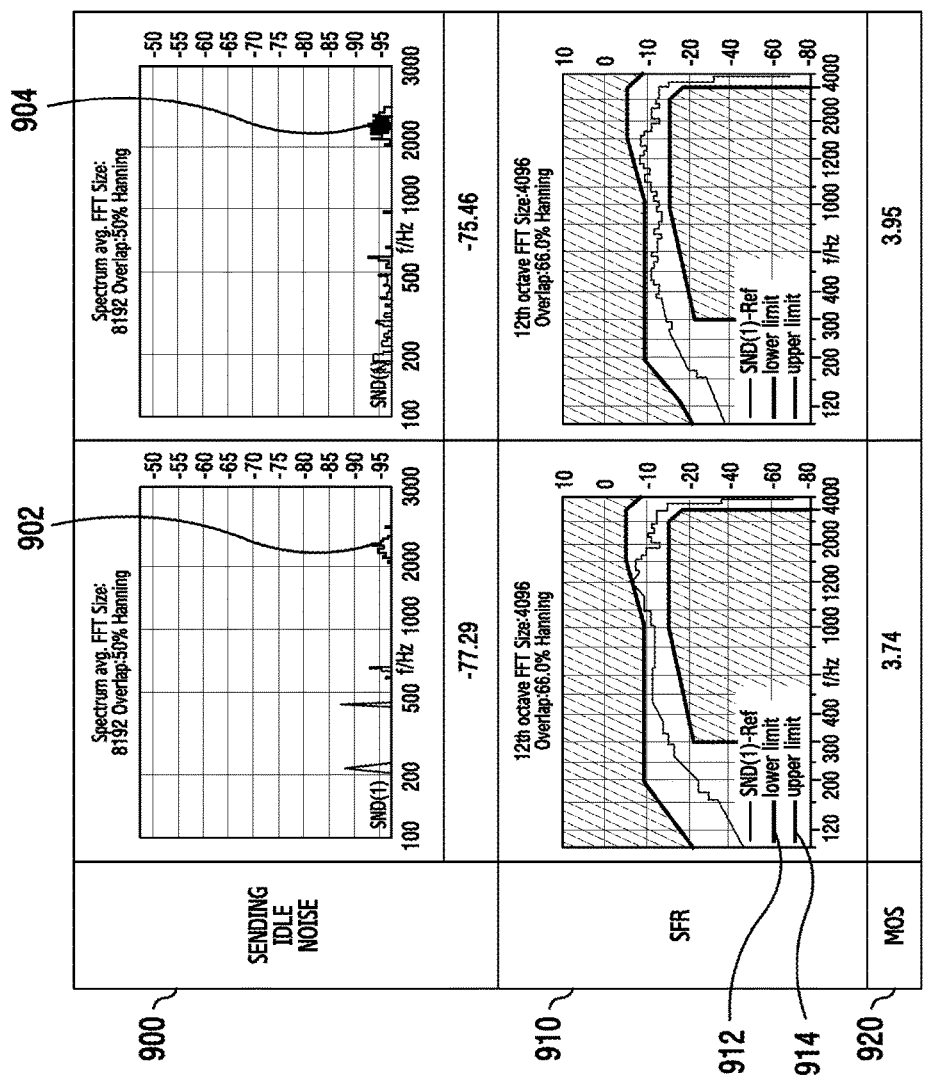
FIGS. 9A and 9B illustrate a performance change graph of an audio signal depending on noise cancellation based on a change in the characteristic of an electric field according to various embodiments of the present disclosure.

FIGS. 9A and 9B illustrate a performance change graph of an audio signal depending on noise cancellation based on a change in the characteristic of an electric field according to various embodiments of the present disclosure. The description below illustrates a change in performance depending on noise cancellation in an environment in which a background noise is set to 15 dB.

Referring to FIG. 9A, in case of a weak electric field, an electronic device may cancel a noise (e.g., TDMA noise) of an audio signal based on the automatic gain control level of −65 dB, the noise suppression level of 6 dB, and the high pass filter value of 350 Hz, according to a noise cancellation variable of the weak electric field.

In this case, an SLR is 6.54 dB and a loss of a sending loudness occurs by noise cancellation. However, a noise cancellation performance of the electronic device may be included in a normal range (e.g., 8±3 dB). An s-noise (900), that a noise (902) in an interval in which the volume of talkers connected in a call is not generated, is −77.29 dBm, and thus the noise cancellation performance of the electronic device may decrease the noise. A noise cancellation performance of the electronic device has an SFR 910 that may be included in a normal range (e.g., between an upper reference value 912 and a lower reference value 914).

A mean opinion score MOS 920 of an electronic device depending on noise cancellation is 3.74, and thus a voice quality depending on noise cancellation may be improved.

Referring to FIG. 9B, in case of a strong electric field, an electronic device may cancel a noise (e.g., TDMA noise) of an audio signal based on the automatic gain control level of −70 dB, the noise suppression level of 0 dB, and the high pass filter value of 300 Hz, according to a noise cancellation variable of the strong electric field.

In this case, an SLR is 6.17 dB and a loss of a sending loudness occurs by noise cancellation. However, a noise cancellation performance of the electronic device may be included in a normal range (e.g., 8±3 dB). An s-noise (900), that indicates a noise (904) in an interval in which the volume of talkers connected in a call is not generated, is −75.46 dBm, and thus the noise cancellation performance of the electronic device may decrease the noise. A noise cancellation performance of the electronic device has an SFR 910 that may be included in a normal range (e.g., between an upper reference value 912 and a lower reference value 914).

A mean opinion score MOS 920 of an electronic device depending on noise cancellation is 3.95, and thus a voice quality depending on noise cancellation may be improved.

As described above, an electronic device may adaptively use a noise cancellation variable to correspond to a weak electric field and a strong electric field in order to cancel a noise of an audio signal and thereby improve a voice quality for a call in the weak electric field and the strong electric field.

According to various embodiments of the present disclosure, an electronic device may determine a plurality of intervals corresponding to a reception signal strength and determine a noise cancellation variable corresponding to each interval. For example, an electronic device may divide a wireless environment of the electronic device into three intervals based on a reception signal strength, and determine a noise cancellation variable corresponding to each interval.

Figure 10:
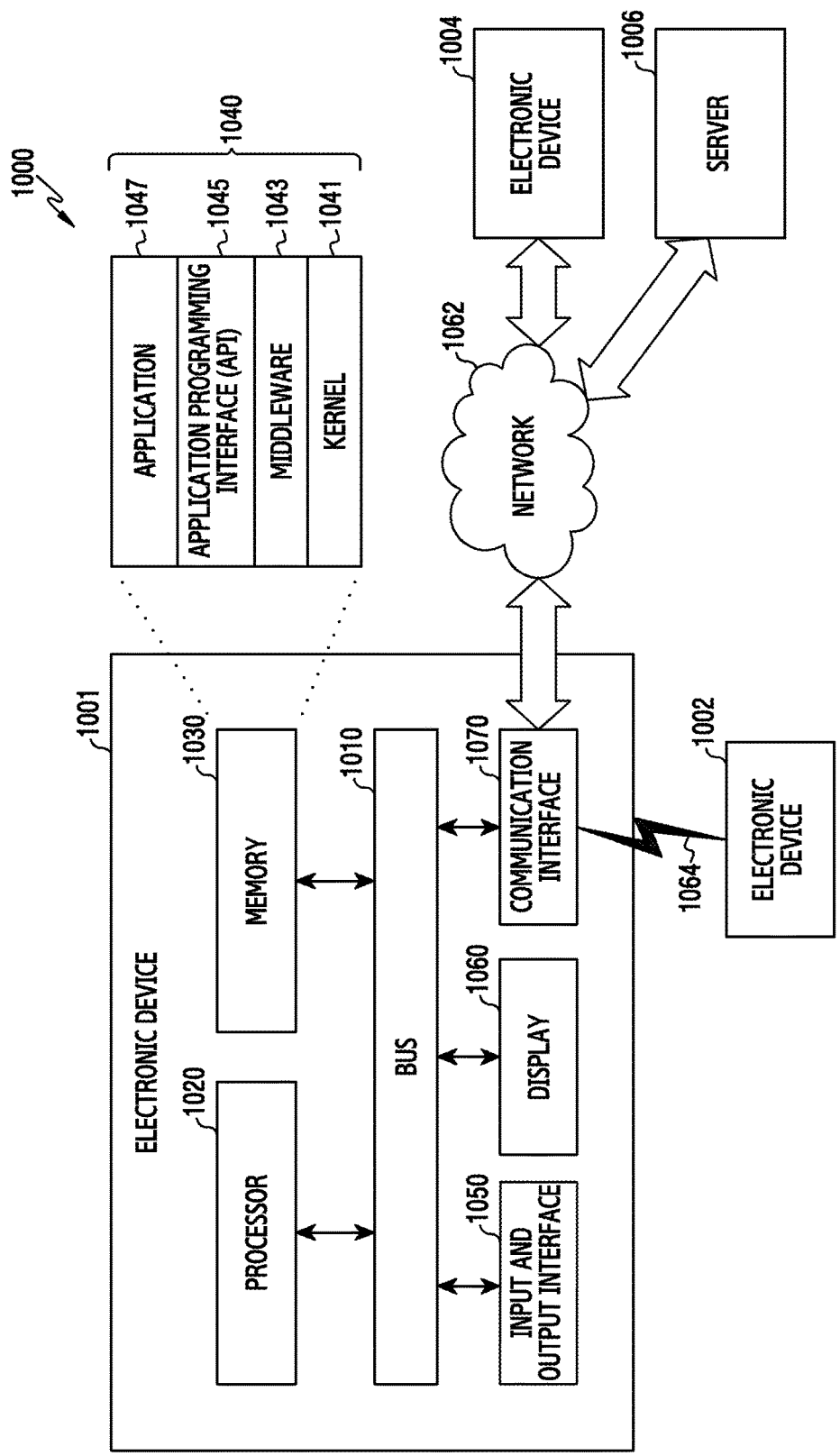
FIG. 10 illustrates an electronic device within a network environment according to various embodiments of the present disclosure.

FIG. 10 illustrates an electronic device within a network environment according to various embodiments of the present disclosure.

Referring to FIG. 10, an electronic device 1001 is illustrated in a network environment 1000. The electronic device 1001 may include a bus 1010, a processor 1020, a memory 1030, an input/output interface 1050, a display 1060, and a communication interface 1070. According to an embodiment of the present disclosure, the electronic device 1001 may omit at least one of the above elements or may further include other elements.

The bus 1010 may include, for example, a circuit which interconnects the elements 1020 to 1070 and delivers communication (for example, a control message and/or data) between the elements.

The processor 1020 may include one or more of a CPU, an AP, and a CP. The processor 1020, for example, may carry out operations or data processing relating to the control and/or communication of at least one other element of the electronic device 1001.

The memory 1030 may include a volatile memory and/or a non-volatile memory. According to an embodiment, a memory 1030 may store software and/or a program 1040. For example, a program may include a kernel 1041, middleware 1043, an application programming interface (API) 1045, an application (or "an application program") 1047, or the like. At least some of the kernel 1041, the middleware 1043, and the API 1045 may be referred to as an operating system (OS).

The input/output interface 1050, for example, may serve as an interface that may transfer instructions or data input from a user or another external device to the other element(s) of the electronic device 1001. Also, the input/output interface 1050 may output commands or data received from other element(s) of the electronic apparatus 1001 to the user or another external device.

The display 1060 may display, for example, various types of contents (e.g., text, images, videos, icons, symbols, or the like) to the user. The display 1060 may include a touch screen and receive, for example, a touch, gesture, proximity, or hovering input using an electronic pen or a user's body part.

The communication interface 1070, for example, may set communication between the electronic device 1001 and an external device (e.g., a first external electronic device 1002, a second external electronic device 1004, or a server 1006). For example, the communication interface 1070 may be connected to a network 1062 through wireless or wired communication to communicate with an external device (e.g., the second external electronic device 1004 or the server 1006).

The wireless communication may use at least one of, for example, long term evolution (LTE), LTE-advanced (LTE-A), code division multiple access (CDMA), wideband CDMA (WCDMA), universal mobile telecommunications system (UMTS), wireless broadband (WiBro), and GSM, as a cellular communication protocol. In addition, the wireless communication may include, for example, a short range communication 1064. The short-range communication 1064 may be performed by using at least one of, for example, Wi-Fi, BT, NFC, and global navigation satellite system (GNSS). The wired communication may include, for example, at least one of a universal serial bus (USB), a high definition multimedia interface (HDMI), recommended standard-232 (RS-232), and a plain old telephone service (POTS). The network 1062 may include at least one of a communication network, such as a computer network (e.g., local area network (LAN) or wide area network (WAN), the Internet, and a telephone network.

Each of first and second external electronic devices 1002 and 1004 may be of a type that is identical to or different from that of the electronic device 1001. According to an embodiment of the present disclosure, the server 1006 may include a group of one or more servers.

Figure 11:
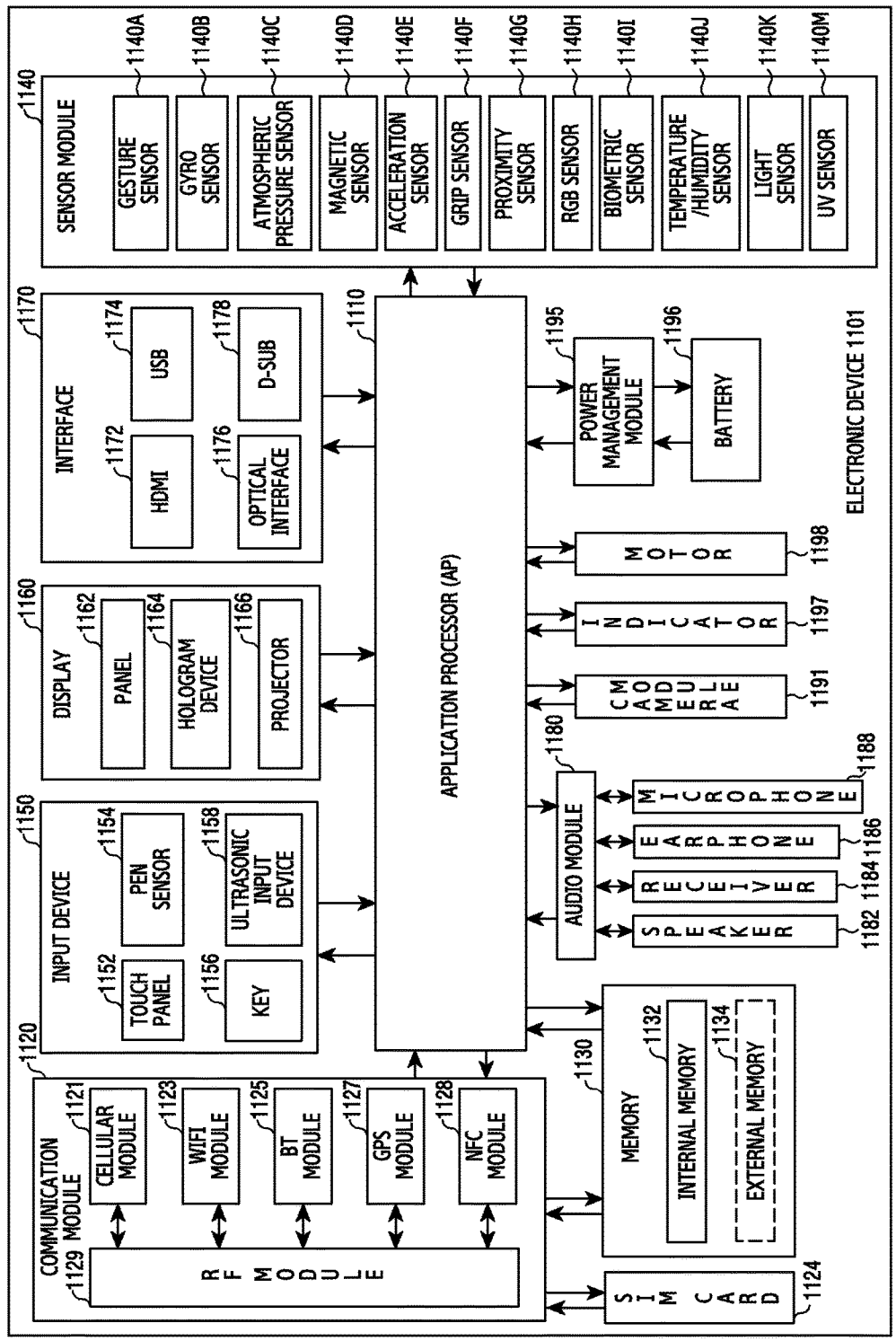
FIG. 11 illustrates a block diagram of an electronic device according to various embodiments of the present disclosure.

FIG. 11 illustrates a block diagram of an electronic device according to various embodiments of the present disclosure.

Referring to FIG. 11, an electronic device 1101 may include the whole or some of the electronic device 1001 illustrated in FIG. 10. The electronic device 1101 may include one or more processors (e.g., AP) 1110, a communication module 1120, a subscriber identification module (SIM) 1124, a memory 1130, a sensor module 1140, an input device 1150, a display 1160, an interface 1170, an audio module 1180, a camera module 1191, a power management module 1195, a battery 1196, an indicator 1197, and a motor 1198.

The processor 1110 may control a plurality of hardware or software elements connected to the processor 1110 by driving an operating system or an application program, and may perform the processing of various pieces of data and calculations. The processor 1110 may be embodied as, for example, a system on chip (SoC). According to an embodiment of the present disclosure, the processor 1110 may further include a graphics processing unit GPU and/or an image signal processor. The processor 1110 may include at least some (e.g., a cellular module 1121) of the elements illustrated in FIG. 11. The processor 1110 may load, into a volatile memory, instructions or data received from at least one (e.g., a non-volatile memory) of the other elements and may process the loaded instructions or data, and may store various data in a non-volatile memory.

The communication module 1120 may have a configuration equal or similar to that of the communication interface 1070 of FIG. 10. The communication module 1120 may include, for example, the cellular module 1121, a Wi-Fi module 1123, a BT module 1125, a GNSS module 1127 (e.g., a GPS module, a Glonass module, a Beidou module, or a Galileo module), an NFC module 1128, and a RF module 1129.

The cellular module 1121, for example, may provide a voice call, an image call, a text message service, or an Internet service through a communication network.

According to an embodiment of the present disclosure, the cellular module 1121 may distinguish and authenticate other electronic devices within a communication network using a SIM (e.g., an SIM card 1124). According to an embodiment of the present disclosure, the cellular module 1121 may perform at least some of the functions that the processor 1110 may provide. According to an embodiment of the present disclosure, the cellular module 1121 may include a CP.

Each of the Wi-Fi module 1123, the BT module 1125, the GNSS module 1127, and the NFC module 1128 may include, for example, a processor for processing data that is transmitted and received through a corresponding module. According to an embodiment of the present disclosure, at least some (e.g., two or more) of the cellular module 1121, the Wi-Fi module 1123, the BT module 1125, the GNSS module 1127, and the NFC module 1128 may be included in one integrated chip (IC) or IC package.

The RF module 1129 may transmit/receive, for example, a communication signal (e.g., an RF signal). According to another embodiment of the present disclosure, at least one of the cellular module 1121, the Wi-Fi module 1123, the BT module 1125, the GNSS module 1127, and the NFC module 1128 may transmit and receive RF signals through a separate RF module.

The SIM 1124 may include, for example, a card including a subscriber identity module and/or an embedded SIM, and may contain unique identification information (e.g., an integrated circuit card identifier (ICCID)) or subscriber information (e.g., an international mobile subscriber identity (IMSI)).

The memory 1130 (e.g., the memory 1030) may include, for example, an internal memory 1132 or an external memory 1134. The external memory 1134 may be functionally and/or physically connected to the electronic device 1101 through various interfaces.

The sensor module 1140, for example, may measure a physical quantity or detect an operation state of the electronic device 1101, and may convert the measured or detected information into an electrical signal. The sensor module 1140 may include, for example, at least one of a gesture sensor 1140A, a gyro sensor 1140B, an atmospheric pressure sensor 1140C, a magnetic sensor 1140D, an acceleration sensor 1140E, a grip sensor 1140F, a proximity sensor 1140G, a color sensor 1140H (for example, a red, green, blue (RGB) sensor), a biometric sensor 1140I, a temperature/humidity sensor 1140J, an illuminance sensor 1140K, and a ultraviolet (UV) sensor 1140M. Additionally or alternatively, the sensor module 1140 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1140 may further include a control circuit for controlling at least one sensor included therein. According to an embodiment of the present disclosure, the electronic device 1101 may further include a processor configured to control the sensor module 1140 as a part of the processor 1110 or separately from the processor 1110, and may control the sensor module 1140 while the processor 1110 is in a sleep state.

The input device 1150 may include, for example, a touch panel 1152, a (digital) pen sensor 1154, a key 1156, or an ultrasonic input device 1158. The touch panel 1152 may further include a control circuit.

The display 1160 (e.g., the display 1060) may include a panel 1162, a hologram device 1164 or a projector 1166. The panel 1162 may include a configuration identical or similar to that of the display 1060 illustrated in FIG. 10.

The interface 1170 may include, for example, an HDMI 1172, a USB 1174, an optical interface 1176, or a D-subminiature (D-sub) 1178. The interface 1170 may be included in, for example, the communication interface 1070 illustrated in FIG. 10. Additionally or alternatively, the interface 1170 may include, for example, a mobile high-definition link (MHL) interface, a secure digital (SD) card/multi-media card (MMC) interface, or an infrared data association (IrDA) standard interface.

The audio module 1180 may bilaterally convert, for example, a sound and an electrical signal. At least some elements of the audio module 1180 may be included in, for example, the input/output interface 1050 illustrated in FIG. 10. The audio module 1180 may process sound information that is input or output through, for example, a speaker 1182, a receiver 1184, earphones 1186, a microphone 1188 or the like.

The camera module 1191 is, for example, a device that may photograph a still image and a dynamic image. According to an embodiment of the present disclosure, the camera module 1191 may include one or more image sensors (e.g., a front sensor or a back sensor), a lens, an image signal processor (ISP) or a flash (e.g., LED, xenon lamp, or the like).

The power management module 1195 may manage, for example, power of the electronic device 1101. According to an embodiment of the present disclosure, the power management module 1195 may include a power management integrated circuit (PMIC), a charger IC, or a battery or fuel gauge.

The battery gauge may measure, for example, a residual quantity of the battery 1196, and a voltage, a current, or a temperature during the charging. The battery 1196 may include, for example, a rechargeable battery and/or a solar battery.

The indicator 1197 may display a particular state (e.g., a booting state, a message state, a charging state, or the like) of the electronic device 1101 or a part (e.g., the processor 1110) of the electronic device 1101. The motor 1198 may convert an electrical signal into a mechanical vibration, and may generate a vibration, a haptic effect, or the like. Although not illustrated, the electronic device 1101 may include a processing unit (e.g., a GPU) for supporting a mobile TV. The processing unit for supporting mobile TV may, for example, process media data according to a certain standard such as digital multimedia broadcasting (DMB), digital video broadcasting (DVB), or mediaFLO™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 12:
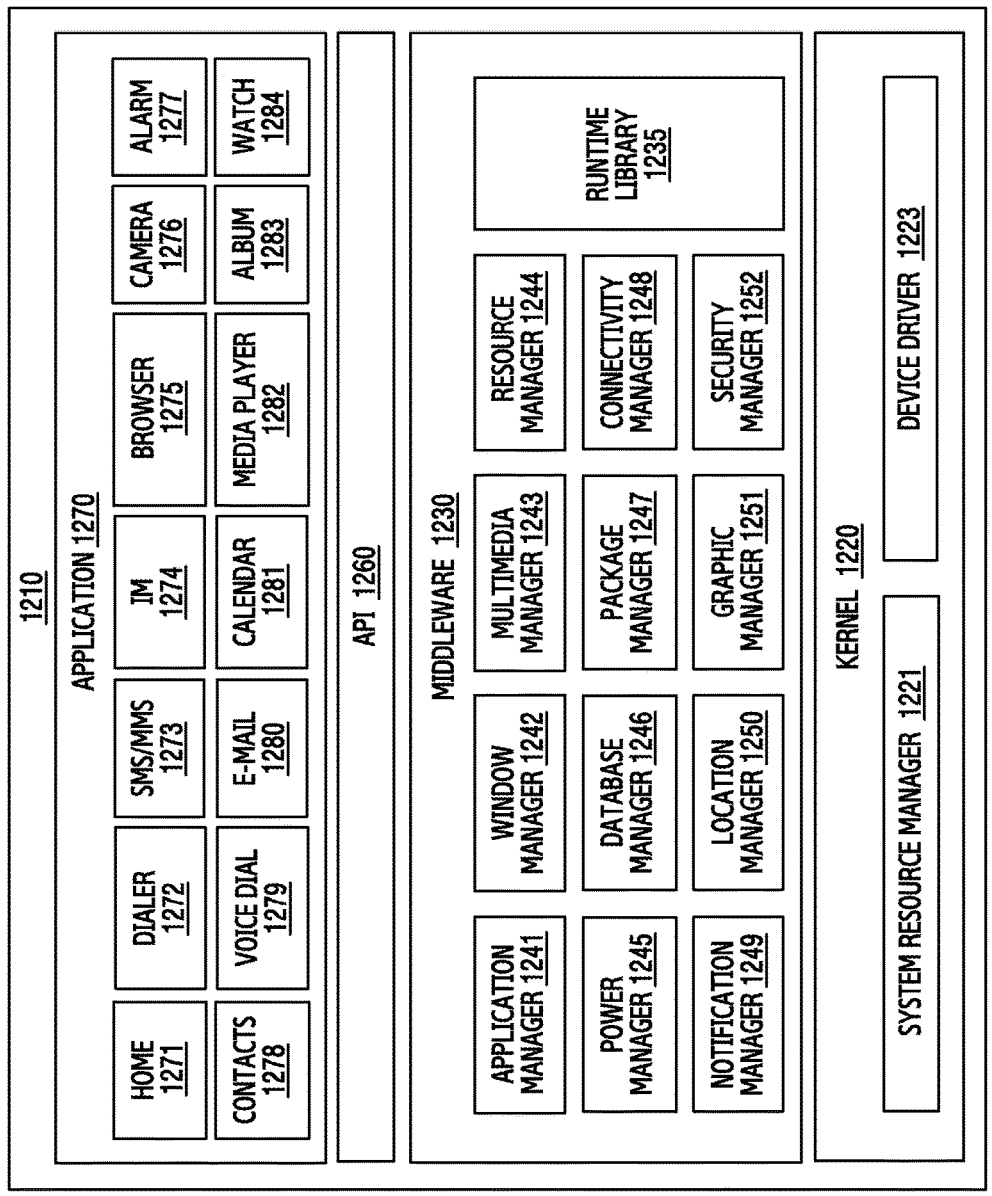
FIG. 12 illustrates a block diagram of a program module according to various embodiments of the present disclosure.

FIG. 12 is a block diagram of a program module according to various embodiments of the present disclosure.

According to an embodiment of the present disclosure, the program module 1210 (e.g., the program 1040) may include an OS for controlling resources related to the electronic device (e.g., the electronic device 1001) and/or various applications (e.g., the application programs 1047) executed in the operating system. The operating system may be, for example, Android, iOS, Windows, Symbian, Tizen, Bada, or the like.

The program module 1210 may include a kernel 1220, middleware 1230, an API 1260, and/or applications 1270. At least some of the program module 1210 may be preloaded on the electronic device, or may be downloaded from an external electronic device (e.g., the electronic device 1002 or 1004, or the server 1006).

The kernel 1220 (e.g., the kernel 1041) may include, for example, a system resource manager 1221 and/or a device driver 1223. The system resource manager 1221 may perform the control, allocation, collection, or the like of system resources. According to an embodiment of the present disclosure, the system resource manager 1221 may include a process manager, a memory manager, a file system manager, or the like. The device driver 1223 may include, for example, a display driver, a camera driver, a BT driver, a shared memory driver, a USB driver, a keypad driver, a Wi-Fi driver, an audio driver, or an inter-process communication (IPC) driver.

The middleware 1230 may provide a function required by the applications 1270 in common, or may provide various functions to the applications 1270 through the API 1260 so that the applications 1270 can efficiently use limited system resources within an electronic device. According to an embodiment of the present disclosure, the middleware 1230 (e.g., the middleware 1043) may include, for example, at least one of a runtime library 1235, an application manager 1241, a window manager 1242, a multimedia manager 1243, a resource manager 1244, a power manager 1245, a database manager 1246, a package manager 1247, a connectivity manager 1248, a notification manager 1249, a location manager 1250, a graphic manager 1251, and a security manager 1252.

According to an embodiment of the present disclosure, when an electronic device (e.g., the electronic device 1001) has a telephone call function, the middleware 1230 may further include a telephony manager for managing a voice call function or a video call function of the electronic device.

The middleware 1230 may include a middleware module that forms a combination of various functions of the above-described elements. The middleware 1230 may provide a module that is specialized for each type of operating system in order to provide a differentiated function. Also, the middleware 1230 may dynamically delete some of the existing elements, or may add new elements.

The API 1260 (e.g., the API 1045) is, for example, a set of API programming functions, and may be provided with a different configuration based on an operating system.

The applications 1270 (e.g., the application programs 1047) may include, for example, one or more applications that can provide functions, such as home 1271, dialer 1272, short-message service (SMS)/multimedia messaging service (MMS) 1273, Instant Message (IM) 1274, browser 1275, camera 1276, alarm 1277, contacts 1278, voice dial 1279, email 1280, calendar 1281, media player 1282, album 1283, clock 1284, health care (e.g., measure exercise quantity or blood sugar), or environment information (e.g., atmospheric pressure, humidity, or temperature information).

According to an embodiment of the present disclosure, the applications 1270 may include an application (hereinafter, referred to as an "information exchange application" for convenience of description) that supports exchanging information between the electronic device (e.g., the electronic device 1001) and an external electronic device (e.g., the electronic device 1002 or 1004).

According to an embodiment of the present disclosure, the applications 1270 may include an application received from an external electronic device (e.g., the server 1006, or the electronic device 1002 or 1004). According to an embodiment of the present disclosure, the applications 1270 may include a preloaded application or a third party application, which may be downloaded from a server. Names of the elements of the program module 1210, according to the above-described embodiments of the present disclosure, may change depending on the type of OS.

According to various embodiments of the present disclosure, at least some of the program module 1210 may be implemented in software, firmware, hardware, or a combination of two or more thereof. At least some of the program module 1210 may be implemented (e.g., executed) by, for example, the processor (e.g., the processor 1110). At least a part of the program module 1210 may include, for example, a module, a program, a routine, a set of instructions, and/or a process for performing one or more functions.

According to various embodiments of the present disclosure, an electronic device may include a communication module configured to provide a voice call service with a counterpart electronic device, a memory configured to store one or more noise cancellation variables, and a processor configured to, when a call with the counterpart electronic device is set up (or configured) through the communication module, control to select a noise cancellation variable corresponding to a reception signal strength in the memory and cancel an audio signal noise based on a noise cancellation variable corresponding to the reception signal.

In various embodiments of the present disclosure, the memory may store a noise cancellation variable for each electric field strength.

In various embodiments of the present disclosure, the processor may include a processor configured to detect an electric field strength corresponding to a transmission power level of the electronic device, select a noise cancellation level corresponding to the electric field strength by the memory, and cancel a noise of an audio signal based on the noise cancellation level corresponding to the electric field strength.

In various embodiments of the present disclosure, the processor may include a processor configured to detect an electric field strength corresponding to a reception signal quality of the electronic device, select a noise cancellation level corresponding to the electric field strength by the memory, and cancel a noise of an audio signal based on the noise cancellation level corresponding to the electric field strength.

In various embodiments of the present disclosure, an audio processing module configured to cancel a noise of an audio signal may be further included based on a noise cancellation variable corresponding to the reception signal.

According to various embodiments of the present disclosure, an electronic device may include a communication module configured to provide a voice call service with a counterpart electronic device, a memory configured to store a noise cancellation variable for each electric field strength, and a processor configured to, when a call with the counterpart electronic device is set up through the communication module, control to detect an electric field strength of the electronic device, change a noise cancellation variable to correspond to the electric field strength in response to a change in the electric field strength, and cancel the noise of an audio signal based on a noise cancellation variable corresponding to the electric field strength.

In various embodiments of the present disclosure, the processor may be configured to detect an electric field strength of the electronic device based on a transmission power level or a reception signal quality of the electronic device.

An electronic device and an operation method therefor according to various embodiments may adaptively determine a variable for noise cancellation based on a wireless environment property (e.g., an electric field strength) of the electronic device to cancel a noise of an audio signal so as to improve a noise cancellation efficiency for the audio signal.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which has been known or are to be developed hereinafter.

According to various embodiments of the present disclosure, at least some of the devices (for example, modules or functions thereof) or the method (for example, operations) according to the present disclosure may be implemented by a command stored in a computer-readable storage medium in a programming module form. The instruction, when executed by a processor (e.g., the processor 110, 1020 or 1110), may cause the one or more processors to execute the function corresponding to the instruction. The computer-readable storage medium may be, for example, the memory 130, 1030 or 1130.

The computer readable recoding medium may include a hard disk, a floppy disk, magnetic media (e.g., a magnetic tape), optical media (e.g., a compact disc read only memory (CD-ROM) and a DVD), magneto-optical media (e.g., a floptical disk), a hardware device (e.g., a ROM, a random access memory (RAM), a flash memory), and the like. In addition, the program instructions may include high class language codes, which can be executed in a computer by using an interpreter, as well as machine codes made by a compiler. The aforementioned hardware electronic device may be configured to operate as one or more software modules in order to perform the operation of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a communication module;
an audio processing module;
a memory; and
a processor configured to:
establish a call with a counterpart electronic device using the communication module, determine a strength of a reception signal,
determine a noise cancellation variable corresponding to the strength of the reception signal, and
control the audio processing module to cancel a noise of an audio signal based on the noise cancellation variable corresponding to the strength of the reception signal,
wherein the noise cancellation variable comprises at least one of:
a cutoff frequency of a high pass filter, or
a noise suppression level.

2. The electronic device of claim 1, wherein the memory is further configured to store at least one noise cancellation variable for different electric field strengths.

3. The electronic device of claim 1, wherein the noise cancellation variable further comprises an automatic gain control (AGC) level.

4. The electronic device of claim 1, wherein the processor is further configured to:
detect an electric field strength corresponding to a transmission power level of the electronic device,
select a noise cancellation variable corresponding to the detected electric field strength from the memory, and
cancel the noise of the audio signal based on the noise cancellation variable corresponding to the detected electric field strength.

5. The electronic device of claim 1, wherein the processor is further configured to:
detect an electric field strength corresponding to a quality of the reception signal,
select a noise cancellation variable corresponding to the detected electric field strength from the memory, and
cancel the noise of the audio signal based on the noise cancellation variable corresponding to the detected electric field strength.

6. The electronic device of claim 5, wherein the quality of the reception signal comprises at least one of:
a strength of a reception signal,
a bit error rate (BER),
a frame error rate (FER), and
a signal-to-noise ratio.

7. An electronic device comprising:
a communication module;
an audio processing module;
a memory; and
a processor configured to:
establish a call with a counterpart electronic device using the communication module,
determine an electric field strength of the electronic device,
determine a noise cancellation variable to correspond to the detected electric field strength, and
control the audio processing module to cancel a noise of an audio signal based on the noise cancellation variable corresponding to the detected electric field strength,
wherein the noise cancellation variable comprises at least one of:
a cutoff frequency of a high pass filter, or
a noise suppression level in response to a change in the electric field strength.

8. The electronic device of claim 7, wherein the noise cancellation variable further comprises an automatic gain control (AGC) level.

9. The electronic device of claim 7, wherein the processor is further configured to determine an electric field strength of the electronic device based on a transmission power level or a quality of a reception signal of the electronic device.

10. The electronic device of claim 9, wherein the reception signal quality comprises at least one of:
the quality of the reception signal,
a bit error rate (BER),
a frame error rate (FER), and
a signal-to-noise ratio.

11. An operation method of an electronic device, the method comprising:
establishing a call with a counterpart electronic device using a communication module;
determining a strength of a reception signal;
determining a noise cancellation variable corresponding to the strength of the reception signal; and
cancelling a noise of an audio signal based on the noise cancellation variable corresponding to the strength of the reception signal,
wherein the noise cancellation variable comprises at least one of:
a cutoff frequency of a high pass filter, or
a noise suppression level.

12. The method of claim 11, wherein the noise cancellation variable further comprises an automatic gain control (AGC) level.

13. The method of claim 11, wherein the determining of the noise cancellation variable comprises:
detecting an electric field strength corresponding to a transmission power level of the electronic device, and
selecting a noise cancellation variable corresponding to the detected electric field strength from a memory of the electronic device.

14. The method of claim 11, wherein the determining of the noise cancellation variable comprises:
detecting an electric field strength corresponding to a quality of the reception signal, and
selecting a noise cancellation variable corresponding to the electric field strength from a memory of the electronic device.

15. The method of claim 14, wherein the quality of reception signal comprises at least one of:
a strength of a reception signal,
a bit error rate (BER),
a frame error rate (FER), and
a signal-to-noise ratio.

16. The method of claim 11, further comprising:
detecting an electric field strength of the electronic device;
changing a noise cancellation variable to correspond to the detected electric field strength in response to a change in the electric field strength; and
cancelling a noise of an audio signal based on the noise cancellation variable corresponding to the detected electric field strength.

17. The method of claim 16, wherein the detecting of the electric field strength comprises:
detecting an electric field strength of the electronic device based on a transmission power level or a quality of a reception signal of the electronic device.

18. The method of claim 17, further comprising:
deactivating the noise cancellation if the detected electric field strength is greater than a reference value.

* * * * *